United States Patent Office 3,690,809
Patented Sept. 12, 1972

3,690,809
LIQUID AZO DYE COMPOSITION AND PROCESS THEREFOR
Richard B. Orelup, Upper Saddle River, N.J., assignor to Morton International, Inc., Chicago, Ill.
No Drawing. Continuation-in-part of application Ser. No. 677,733, Oct. 24, 1967, which is a continuation-in-part of application Ser. No. 468,551, June 30, 1965, which in turn is a continuation-in-part of application Ser. No. 230,268, Oct. 12, 1962, all now abandoned. This application Apr. 5, 1971, Ser. No. 131,409
Int. Cl. D06p 1/08
U.S. Cl. 8—6
4 Claims

ABSTRACT OF THE DISCLOSURE

A liquid azo dye composition which has at least about 40 percent of the color value of a comparable solid dye, exhibits permanent homogeneous liquidity, and is capable of complete and instantaneous solubility in petroleum distillates. The dye composition consists essentially of between about 50–75% by weight of a mixture of azo dyes containing $C_5$–$C_{12}$ alkyl-beta-naphthols or p–$C_5$–$C_{12}$ alkyl phenol in the dye molecule and about between 50–25% by weight of a liquid organic viscosity depressant compatible with the azo dyes.

CROSS REFERENCE TO PRIOR APPLICATION

This is a continuation-in-part of application No. 677,733 filed Oct. 24, 1967, now abandoned, which was a continuation-in-part of Ser. No. 468,551 filed June 30, 1965, now abandoned, which in turn was a continuation-in-part of Ser. No. 230,268 of Oct. 12, 1962 now abandoned.

BACKGROUND OF THE INVENTION

Field of the invention

This invention generally relates to dyes and is particularly directed to liquid azo dye compositions and processes for their preparation. These liquid azo dye compositions are known in the trade as Automate dyes and are commercially available under the Automate trademark.

While the inventive liquid azo dye compositions have a wide field of application and may successfully be used, for example, in ink manufacture, the coloring of synthetic plastic materials, wood staining and the like, they are particularly useful as additives to liquid petroleum distillates and products. The invention will, therefore, in the following be explained primarily in connection with the coloring of petroleum products such as gasoline, lubricating oils and the like petroleum distillates, it being understood, however, that the invention is not limited to this particular field of application.

Description of the prior art

It is common practice to color many petroleum products for identification and other purposes. The dyes customarily used are supplied in solid physical form, to wit, either as powders or in a variety of agglomerated states such as granules, flakes or beads. The latter are intended to overcome the disadvantages of powdered dye, which tends to dust, making handling objectionable, and to cake, which interferes with operation of modern equipment for dye application. However, the solubility rate of most agglomerated dye forms is considerably less than that of powdered dye, which restricts their use in many applications.

All customarily used dyes have relatively low solubilities in organic solvents, regardless of their solid form. For example, a 5% solubility in organic solvents is considered extremely high, while most dyes have a solubility considerably lower than 2%. Such solubilities have seriously limited the application of these dyes as previously prepared solutions because of high added solvent cost, and expensive equipment requirements.

Serious but unsuccessful attempts have been made to supply azo dye compositions in concentrated liquid form. More recently, it has been suggested to prepare a pourable dye paste concentrate. Although such paste concentrates constitute a significant improvement in this art, the distribution of a paste in a large volume of liquid is still more difficult than the preparation of an intimate mixture between two liquids.

Accordingly, it is a primary object of this invention to provide for a liquid azo dye composition which has an excellent color value, is stable, exhibits complete and substantially instantaneous solubility in petroleum distillates, and may be prepared in a relatively simple manner.

It is also an object of this invention to provide a process for preparing such liquid azo dye compositions.

Generally, it is an object of this invention to improve on the art of azo dyes and their application.

SUMMARY OF THE INVENTION

Briefly, a liquid azo dye composition of this invention is characterized in that it
(a) Has a color value which is at least about forty percent of the color value of a comparable solid azo dye;
(b) Exhibits permanently homogeneous liquidity;
(c) Is capable of complete and substantially instantaneous solubility in petroleum distillates; and
(d) Essentially consists of between about 50–75 percent by weight of a mixture of azo dyes containing $C_5$–$C_{12}$ alkyl-beta-naphthols or p–$C_5$–$C_{12}$ alkyl phenols in the dye molecule and about between 50–25 percent by weight of a liquid organic viscosity depressant compatible with the azo dyes. The term "azo dyes," as is understood by those skilled in the dye art, refers to dyes containing the azo (—N=N) linkage.

In a preferred embodiment, the azo dyes correspond to the formula.

wherein X is isomeric heptyl beta-naphthol or p-nonyl phenol and A is an aromatic residue of the benzene or naphthalene series.

The symbol A in the formula may stand for benzene, ring substituted benzene, azobenzene, ring substituted azobenzene, naphthalene, ring substituted naphthalene, azonaphthalene or ring substituted azonaphthalene represented by the formulae

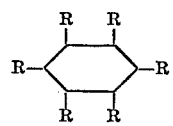

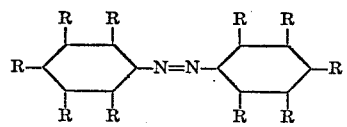

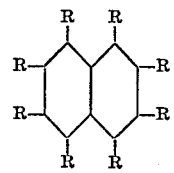

and

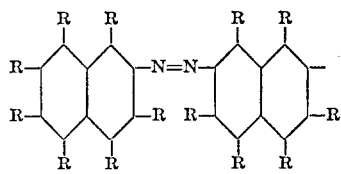

in which R is hydrogen, methyl, ethyl, propyl, butyl and methoxy.

Compounds of the following formulae yield superior liquid dye compositions when admixed with a suitable organic viscosity depressant in the indicated ratio:

Orange Dyes

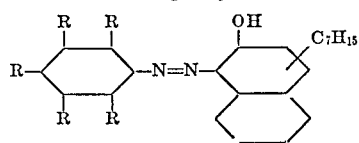

wherein R is hydrogen, methyl, ethyl, propyl, butyl or methoxy;

Red and Purple Dyes

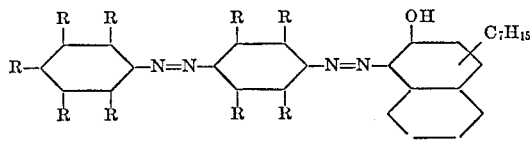

wherein R is hydrogen, methyl, ethyl, propyl, butyl or methoxy:

Orange Dye

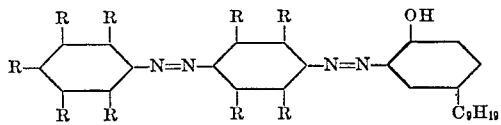

wherein R is hydrogen or methyl:

Yellow Dye

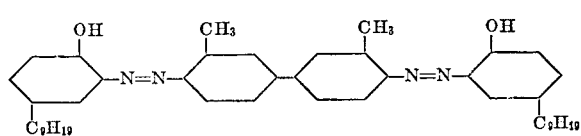

The dye compositions are totally insoluble in water.

The preferred azo dyes of the composition may be obtained by coupling a diazonium compound with a heptyl beta-naphthol intermediary as defined hereinbelow or a p-nonyl phenol.

The diazonium compound may be any suitable diazotized aromatic amine. As in generally known in this art, certain functional groups commonly used as substituents of aromatic amines should be avoided, such as, for example, hydrophilic groups, e.g. sulphonic acid or carboxylic acid groups. Halogen, alkoxy, alkyl, trifluoromethyl, nitro, cyano and hydroxyl groups behave in indifferent manner in most instances and, therefore, can usually be included in the aromatic amine moiety, although in some instances it may be undesirable to employ nitro and hydroxyl groups.

The viscosity depressant of the inventive azo dye compositions may be aryl, i.e., aromatic hydrocarbons such as benzene, toluene, xylene, styrene, alkyl-aryl hydrocarbons such as benzene, toluene, xylene, styrene, alkylcarbons such as alkyl benzenes and alkyl naphthalenes, aliphatic petroleum distillates, such as, for example, kerosene, a naphthenic solvent, phenolic liquids including cresols, "tar acids" and alkylated phenols, chlorinated solvents such as chloroform, ethylene dichloride, perchloroethylene, and chlorobenzenes, alcohols having at least five carbon atoms such as amyl and higher alcohols, liquid fatty acids such as, for example, oleic acid, ketones such as acetone, methyl ethyl ketone, and methyl isobutyl ketone, and esters, for example, ethyl acetate, butyl acetate and amyl acetate.

The viscosity depressant imparts liquidity to the composition. The choice of the particular viscosity depressant will be dependent on a number of different factors such as the desired viscosity, specific gravity, flash point and the like physical characteristics of the final composition. The particular purpose for which the composition is intended and costs are, of course, other factors to be considered. In most instances, commercial grade xylols are eminently suitable. For some purposes as, for example, in ink manufacture or for the coloring of plastics, aromatic constituents in the final composition are usually undesirable and viscosity depressants such as ethyl acetate or other esters or ketones such as methyl isobutyl ketone may then be used. Resins, varnishes and many alcohols may also be used as viscosity depressants.

At this point, it should be emphasized that the viscosity depressant does not serve the function of a solvent per se, but is a carrier for the azo dye proper in which the azo dye is soluble in practically unlimited quantities. The amount of viscosity depressant in the final composition may equal that of the azo dye, but it is preferred that the viscosity depressant be present in a minor amount, i.e., less than 50% by weight. Conversely, the azo dye concentration in the final composition may equal that of the viscosity depressant, but it is preferred that the azo dye be present in a major amount, i.e., more than 50% by weight.

The specific proportion of viscosity depressant in the final composition will be determined by consideration of standardization of color value and viscosity rather than as the quantity required to prevent solidification.

The primary feature of the inventive composition is its liquidity under customary conditions of application or storage. The term "liquid" as used herein is deemed to refer to a homogeneous single phase fluid, which flows readily and may be poured, pumped or metered for application purposes. Thus, "liquid" as used herein does not refer to a two phase suspension or emulsion of finely divided solid dye in a fluid carrier, but the inventive dye composition consists of a clear single phase liquid.

The expression "complete and substantially instantaneous solubility in petroleum distillates," refers to dissolution of the liquid dyes of this invention in common products such as gasoline, lube oil, transmission fluid, diesel fuel and other mobile organic liquids at a rate virtually as fast as that of simply bringing two miscible liquids together. This property of instantaneous solubility has been utilized by oil companies as a test basis for evaluation of the efficacy of competitive purported liquid dyes in the following manner: Several drops of liquid dye are dropped into a small beaker containing a solvent (often kerosene), which is at rest. The drops fall through the mass, partly dissolving, and the remainder coming to rest at the bottom. The whole is gently agitated for a few seconds. A true liquid dye, such as one of the present invention, dissolves completely. "False" liquid dyes leave a major portion of precipitated tar or solid.

Similarly, if in the same test a prior art solid dye is added as powder, flakes, granules etc., very little solution takes place. Increased solution will occur with agitation over a relatively long period of time, up to the solubility limit of the particular dye, leaving from about 2% to 5% of insoluble matter. Thus in comparing solubility properties of solid dyes, one must consider rate of solubility, total solubility and true insolubles. These will vary somewhat with nature of the solvent and temperature.

In practical application, total solubility of the commonly used solid dyes is usually less than 2% in the product to be dyed, and even at the usual minute use concentration of about 1 pound of dye per 40,000 gallons of gasoline, the solubility rate is poor, requiring prolonged agitation. This has been alleviated with varying degrees of success by making on site slurries (suspension and part solution) of solid dyes, master solutions, or use of certain dye concentrates, which somewhat increased solubility rates. In essence, use of solid dyes has always involved too much time, effort and labor to satisfy the oil refining industry. In addition, the use of solid, powdered dyes presents a handling problem which is obnoxious to personnel due to the excessive dusting of fine dye particles. In an effort to overcome this problem solid dyes have been provided in a variety of compacted forms, e.g., granules and flakes. However, as is readily understandable, this also had the effect of decreasing the solubility rate. Solid dyes are still used, but principally in older installations where suitable mechanical handling and mixing systems have been installed to ameliorate the aforementioned problems. Nevertheless, the increased efficiency of the present liquid dyes has led to their adoption despite their higher cost when compared to comparable solid dyes.

Another unexpected feature of the liquid azo dyes of the present invention is their practically instantaneous solubility in polypropylene, a synthetic resin having a wide range of commercial uses and a particular use in the preparation of ribbons or tapes for gift wrapping. Polypropylene is notoriously difficult to dye, it being necessary to melt the polypropylene in the presence of a solid dye and then to subject the mixture to several homogenizations by the use of a Banbury or three roller mill to obtain a uniform distribution of color. In the preparation of colored polypropylene ribbon, which generally contains as much as from about 1 to about 3% by weight of dye, a yellow dye of the present invention,

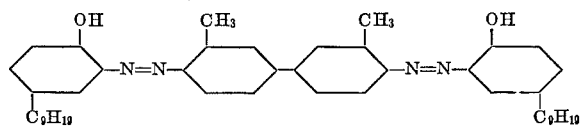

known commercially as "Automate Yellow No. 8," is dissolved almost instantly in polypropylene fed into a heated zone and melted prior to extrusion. The same dye dissolves readily in cold polypropylene pellets, penetrating uniformly into and through the pellets to provide the required dye concentration. By either hot or cold method, it would be difficult to dissolve sufficient solid dye to develop a color value equal to that provided by the present liquid azo dye compositions. Similar in action to Automate Yellow No. 8 in coloring polypropylene is a red dye of the present invention which has the following formula:

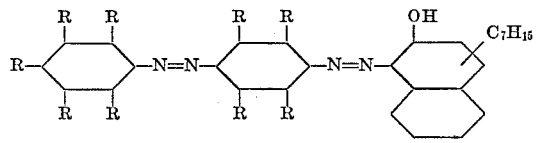

wherein R is either H or $CH_3$.

In addition to increased solubility and rate of solubility, the present liquid azo dyes provide better light fastness than comparable solid dyes and also better resistance to "bleeding" or "sublimation," terms which refer to the tendency of the dye to migrate from the finished product to other materials.

In appreciating the advantages of the inventive liquid dye composition, it should be considered that the prior art azo dyes have a relatively low solubility in solvents. Usually, and as previously mentioned, it is not possible to prepare dye solutions having a dye content in excess of 2% and even at such low concentrations the solutions are not stable. From an economical point of view, the solvents are usually more expensive than the dye proper. The color value of such prior art dye solutions is only about 1 to 2% of the color value of the corresponding dry dye calculated on a weight basis. By contrast, the liquid dye compositions according to the present invention have at least 40% of the color value of solid dyes presently used for petroleum application. Other prior art solid dyes used for ink manufacture and applications in the plastic industry often have even lower color values so that in some cases the liquid dye compositions of this invention have equal or even greater color value than comparable prior art solid dyes.

A liquid dye composition must have certain desirable physical properties in order to be suitable for application as additive to a petroleum product. These properties may be summarized as follows:

(1) The dye composition has to be stable for indefinite periods of time. Thus, solid matter should not separate upon long storage and/or at low temperatures. Further, no portion of the product should readily volatilize, as volatilization would result in change of color value or other physical properties.

(2) The viscosity of the liquid system must be sufficiently low so as to facilitate handling. This means that the flow properties of the liquid should permit incorporation of the liquid system in a petroleum product without previous heating. If the liquid dye composition is to me added to petroleum distillates, the material should be capable of passage through miniature pumps and metering devices capable of injecting minute quantities of the dye composition into a moving stream at controlled rates. From a practical point of view, the dye composition therefore should advantageously have a viscosity at 20° C. which is comparable to that of light crank case oil.

(3) The stability of color value should be comparable to that of solid dyes. Solid dyes are usually extremely stable with regard to color value in dry state, but lose color value at varying rates upon dissolution.

The invention will now be illustrated by a number of examples, it being understood, however, that these examples are given by way of illustration and not by way of limitation, and that many changes and alterations may be effected in quantity, choice of raw material and process conditions in general without affecting in any way the scope and spirit of the invention as recited in the appended claims.

DESCRIPTION OF THE PREFERRED EMBODIMENTS

Example I.—Coupling of heptyl beta-naphthol with diazonium compound

One orange and two different red dyes are prepared. Each dye contains heptyl beta-naphthol as part of the azo dye molecule. The coupling is effected in conventional fashion, although mechanical problems arise due to the physical nature of the dyes so that certain procedural changes with respect to ordinary dye coupling have to be effected. This is particularly true with regard to larger than laboratory batches.

Azo dyes are commonly prepared in aqueous media and are then separated from the coupling suspension, washed free of salts, and dried. The azo dyes prepared in accordance with the present invention are also separated from the coupling suspension and dried in the form of a molten tar. The tar is then admixed with the viscosity depressant in a desired ratio, whereafter the resulting liquid is filtered to remove slats and impurities.

(A) Preparation of orange dye of the formula

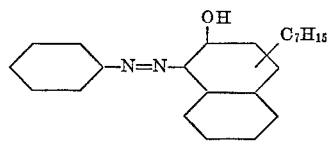

93 grams of aniline are dissolved in 1 liter of water and 267 grams of 20° Bé. HCl. Ice is added to the solution and diazotization is carried out at 0° C., by the addition of 70 grams of sodium nitrite.

265 grams of heptyl beta-naphthol are dissolved in 2 liters of hot water and 200 grams of 45% potassium hydroxide. The solution thus obtained is then diluted with 3600 ml. of cold water, whereby a clear solution is obtained. Ice is added to the solution and the solution containing the diazonium compound is run in slowly at a temperature of 0 to 10° C. A reddish-orange suspension of soft tar form is obtained while a small portion of the dye is obtained in the form of a fine dispersion due to the surface active nature of the heptyl beta-naphthol potassium salt. At the end of the coupling procedure, a spot test on filter papers shows only a trace of excess heptyl beta-naphthol in solution. It will be noted that the intermediary hepyl-beta-naphthol is dissolved in a potassium hydroxide solution as distinguished from a sodium hydroxide solution as commonly employed in this type of coupling reaction. Potassium hydroxide is preferred as it has been found that the intermediary is more soluble in potassium hydroxide and also more stable therein.

Separation of dye: Hydrochloric acid is then added to the reaction mixture until the suspension is acid to congo paper, causing considerable dehydration of the soft, dye comprising tar. The mixture thus obtained is then warmed slightly, causing the then liquid tar to dehydrate further and to float on the surface. Agitation is stopped and the dye is removed from the surface and transferred to a flask. The dye is heated under mild vacuum conditions under stirring until dry and a sample is tested for color value. The crude dye is a tar of indefinite low melting point. The tar becomes fluid above approximately 10° C.

A viscosity depressant, in this instance xylol, is added to the tar to obtain a liquid dye composition having a xylol content of approximately 25%, as the liquid is brought to standard color value. The liquid is then filtered and ready for application. Upon storage for several months, no precipitation or sedimentation could be observed.

(B) Two red dyes of the following formula were prepared:

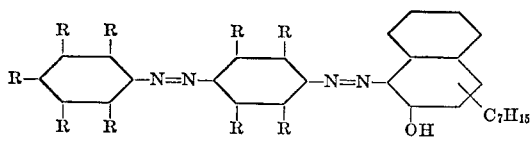

wherein R stands for methyl or hydrogen. The distinction between the two reds is in the number and distribution of the methyl groups in the substituted amino-azo-benzene radical.

A quanity corresponding to 1.0 gram mole of a mixed amino-azo compound consisting of methyl derivatives of amino-azo benzene is diazotized in the usual fashion at a temperature of 5 to 10° C. with 3.0 moles of hydrochloric acid and 1.0 mole of sodium nitrite. The diazotized solution is clarified and is then run to a coupling solution of 1.0 mole of heptyl beta-naphthol; the heptyl beta-naphthol had previously been dissolved in 310 grams, 45% KOH solution. A red suspension of dispersed solid dye is formed. Following completion of the coupling at 5 to 10° C., the suspension is acidified as in Example I(A) and warmed to approximately 20° C. The reaction mixture is then filtered in the form of a dehydrated solid. Alternately, the coupling mixture may be heated to approximately 40° C. which results in floating of the product as a dehydrated viscous tar which may be removed from the surface. The tar becomes fluid above about 40° C. The dye thus obtained is then dried, standardized with a viscosity depressant and filtered as a clear red color.

(C) The procedure of Example I(B) is repeated, but as raw material a modified amino-azo-benzene derivative is used as diazonium component.

Example II

Ten ounces (weight) of the fluid orange dye composition obtained in accordance with Example I(A) are dissolved in 10,000 gallons of regular grade leaded gasoline. A gasoline solution having a color intensity equivalent to that of representative colored gasoline is obtained.

Example III

Twelve ounces (weight) of a fluid red composition obtained in accordance with Example I(B) are dissolved in 10,000 gallons of a premium grade leaded gasoline to produce a solution of color intensity equivalent to that of a representative present colored gasoline.

Example IV

Sixteen ounces (weight) of a fluid red dye composition produced in accordance with Example I(C) are dissolved in 1,000 gallons of a typical automatic transmission fluid formulation. A white blotter is placed beneath a suspect automobile transmission. Appearance of red color drops on the blotter indicate a leaking transmission unit.

Example V.—Preparation of penetrating wood stains

Four parts of a fluid red dye composition produced in accordance with Example I(C) are dissolved in 96 parts of an aromatic hydrocarbon solvent, for example, toluene. The solvent contains 5 to 10 parts of a resin, drying oil or varnish. A penetrating oil stain is obtained which may be used for the finishing of wood.

Example VI.—Preparation of nitro-cellulose transparent lacquer

A solvent mixture is prepared comprising ethyl acetate, amyl acetate, diacetone alcohol and xylol. Two parts of nitrocellulose as ½-second nitro-cellulose solution, 0.5 to 1.0 parts of dioctylphthalate and 1 to 2 parts of maleic alkyd resin are added to 100 parts of the solvent mixture. Two parts of a liquid orange dye composition in accordance with Example I(A) are dissolved in the liquid system, forming a colored lacquer which may be applied as a metal or foil coating. This composition is particularly suitable to coat aluminum foil, steel cans, jar lids and the like.

Example VII.—Preparation of rotogravure ink

Ten parts of liquid orange dye composition produced in accordance with Example I(A) are dissolved in a solution of five parts of limed and/or zincated rosin in 100 parts of kerosene.

Example VIII

Fifteen parts of liquid red dye composition produced in accordance with Example I(C) are dissolved in a solution of 8 parts of chlorinated rubber and one part zincated rosin in 100 parts of xylol, high flash naphtha or a mixture of these solvents. Insoluble pigments may be added to the ink.

Example IX

A quantity corresponding to 1.0 gram mole of a mixed amino-azo compound, consisting of methyl derivatives of amino-azo benzene is diazotized in the usual fashiin by suspending in 2 liters of water with 2.5 gram moles of hydrochloric acid. Ice is added to maintain a temperature of 5 to 10° C., while 1.0 gram mole sodium nitrite, as a solution, is run in. The solution is clarified. A suspension of 1.0 gram mole para nonyl phenol in 5 liters water and 2.0 gram moles of potassium hydroxide is prepared and cooled to 0° C. The solution of diazotized amino azo compound is run in slowly, with stirring, and the mixture stirred until coupling is complete. The product may be isolated by filtration and washed, or alternately the suspension acidified and heated to approximately 30° C., where it separates as a floating fluid tar, which may be removed from the surface. The dye thus obtained is dried and diluted with an aromatic solvent, such as xylene, for purposes of standardization and lowering of viscosity. The product is filtered producing a homogeneous red liquid, which dissolves in organic solvents to produce an orange solution.

Example X

The procedure of Example IX is followed, except that 0.5 gram mole of ortho tolidine is used in place of the methyl derivatives of amino azo benzene. The product is a homogeneous orange liquid which dissolves in organic solvents to produce a yellow solution.

While specific embodiments of the invention have been shown and described in detail to illustrate the application of the inventive principles, it will be understood that this invention may be embodied otherwise without departing from such principles.

What is claimed is:

1. A liquid azo dye composition which:
   (a) has a color value which is at least about forty percent of the color value of a comparable solid azo dye;
   (b) exhibits permanently homogeneous liquidity;
   (c) is capable of complete and substantially instantaneous solubility in petroleum distillates;
   (d) consists essentially of between about 50–75% by weight of a mixture of azo dyes containing $C_5$–$C_{12}$ alkyl beta naphthols or p–$C_5$–$C_{12}$ alkyl phenols in the dye molecule, said azo dyes having the general formula $$A-N=N-X$$

wherein
   A is selected from the group consisting of

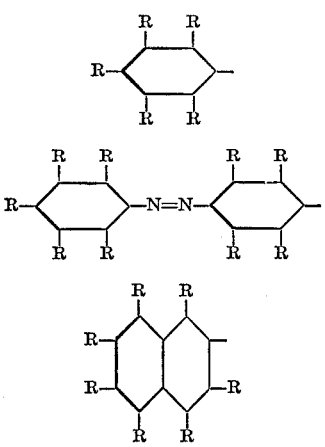

and

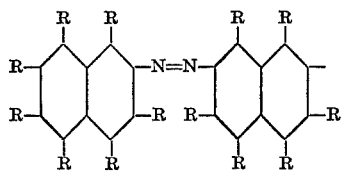

in which R is selected from the group consisting of hydrogen, methyl, ethyl propyl, butyl, and methoxy;

X is selected from the group consisting of $C_5$–$C_{12}$ alkyl beta naphthols and p–$C_5$–$C_{12}$ alkyl phenols; and from about 50–25% by weight of a viscosity depressant compatible with the azo dyes, said viscosity depressant being selected from the group consisting of unsubstituted and alkyl substituted aryl hydrocarbons, aliphatic petroleum distillates, phenolic liquids, chlorinated solvents, alcohols having at least five carbon atoms unsaturated higher fatty acids, ketones selected from the group consisting of acetone, methyl ethyl ketone and methyl isobutyl ketone, and an ester selected from the group consisting of alkyl acetates having from 1 to 5 carbon atoms in the alkyl group.

2. A liquid azo dye composition as claimed in claim 1, wherein the azo dyes have the formula

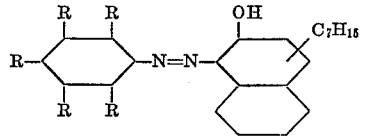

wherein R is hydrogen, methyl, ethyl, propyl, butyl or methoxy;

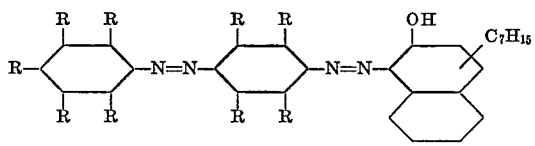

wherein R has the above meaning;

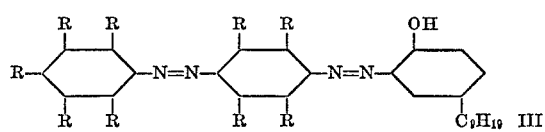

wherein R is hydrogen or methyl; or

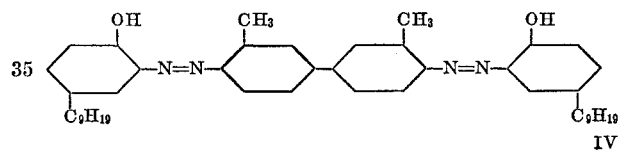

3. A process of preparing a liquid dye composition which comprises coupling a $C_5$–$C_{12}$ alkyl beta-naphthol or a p–$C_5$–$C_{12}$ alkyl phenol with a diazotized aromatic amine to obtain an azo dye, separating the azo dye from the coupling solution, drying the azo dye and admixing more than about 50% by weight of the azo dye with less than about 50% by weight of a viscosity depressant selected from the group consisting of unsubstituted and alkyl substituted aryl hydrocarbons, aliphatic petroleum distillates, phenolic liquids, chlorinated solvents, alcohols having at least five carbon atoms, unsaturated higher fatty acids, ketones selected from the group consisting of acetone, methyl ethyl ketone and methyl isobutyl ketone and an ester selected from the group consisting of alkyl acetates having from 1 to 5 carbon atoms in the alkyl group to obtain a liquid dye composition.

4. A process as claimed in claim 3 wherein the $C_5$–$C_{12}$ alkyl beta-naphthol is a heptyl beta naphthol compound, while said p–$C_5$–$C_{12}$ phenol is p-nonyl phenol.

References Cited
UNITED STATES PATENTS

| | | | |
|---|---|---|---|
| 2,989,358 | 6/1961 | Jurgeleit | 8—41 |
| 3,494,714 | 2/1970 | Litke | 8—6 |

FOREIGN PATENTS

| | | | |
|---|---|---|---|
| 835,657 | 5/1960 | Great Britain | 44—59 |

GEORGE F. LESMES, Primary Examiner

P. C. IVES, Assistant Examiner

U.S. Cl. X.R.

8—62, 6.5, 79, 94, 44; 44—59; 106—178, 189, 195, 23, 193, 198, 22, 30, 32

UNITED STATES PATENT OFFICE
CERTIFICATE OF CORRECTION

Patent No. 3690809            Dated September 12, 1972

Inventor(s) RICHARD B. ORELUP

It is certified that error appears in the above-identified patent and that said Letters Patent are hereby corrected as shown below:

1. Column 3, Line 68 — DELETE the following:

benzene, toluene, xylene, styrene, alkylcarbons such as

2. Column 6, Line 61

The word "slats" should be "salts"

Column 8, Line 5
3. The word "fashiin" should be "fashion"

Signed and sealed this 20th day of March 1973.

(SEAL)
Attest:

EDWARD M. FLETCHER, JR.
Attesting Officer

ROBERT GOTTSCHALK
Commissioner of Patents